United States Patent [19]

Shemtov

[11] 3,987,532

[45] Oct. 26, 1976

[54] ASSEMBLING APPARATUS

[75] Inventor: Sami Shemtov, Brooklyn, N.Y.

[73] Assignee: I-T-E Imperial Corporation EFCOR Division, East Farmingdale, N.Y.

[22] Filed: Apr. 11, 1975

[21] Appl. No.: 567,396

[52] U.S. Cl. ............................ 29/234; 29/253; 29/200 R; 29/525
[51] Int. Cl.² .......................................... B23P 19/04
[58] Field of Search ............ 29/234, 237, 244, 253, 29/282, 200 R, 525; 100/292; 241/221

[56] References Cited
UNITED STATES PATENTS

| 189,399 | 4/1877 | Tompkins et al. | 241/221 |
| 1,500,845 | 7/1924 | Plauson | 241/221 |

Primary Examiner—James L. Jones, Jr.
Attorney, Agent, or Firm—Friedman, Goodman & Teitelbaum

[57] ABSTRACT

Apparatus is disclosed for assembling first and second tubular components in a telescoping, press-fit relationship with each other. The apparatus includes a rotatable, motor driven plate including on the periphery thereof a plurality of component support means, a portion of each being spring biased in a radially outward direction. The two components are partially telescoped into each other by hand and then are loosely mounted on the support means which travel along an arcuate path that is in opposition to a fixed cam having a decreasing radius with respect to the axis of rotation of the rotatable plate. The cam surface bears against and forces one of the components into the other component as the support means move therepast. A movable cam section is also provided to accommodate tolerance variations in the components. The movable cam section is positioned proximate the exit end of the fixed cam and is normally biased in a direction that will push the inner component further into the outer component. Means are also provided for adjusting the pressure of the spring that urges the movable cam section towards the telescoped components mounted on the support members.

9 Claims, 7 Drawing Figures

ASSEMBLING APPARATUS

BACKGROUND OF THE INVENTION

1. FIELD OF THE INVENTION

This invention relates generally to assembly apparatus and more particularly to apparatus for pressing one component into another component where there is a tight fit between the two components.

2. DESCRIPTION OF THE PRIOR ART

There are many instances wherein it is necessary to telescopically insert one component into another component. This operation can be done by hand, but where there is a tight fit between these two components in the assembled condition, hand operation is both tedious and costly. Operations of this type, when carried out by hand, also cause excessive and early fatigue for the operator and therefore increases the likelihood of industrial accidents. It will be evident that if means were provided for replacing the hand operation by an automatic device, assembly costs can be drastically reduced and efficiency can be greatly increased.

SUMMARY OF THE INVENTION

The present invention, as will be described more fully hereinafter, provides automatic assembly apparatus for telescopingly pressing one component into another. The only manual operations involved with the present invention are the pre-assembly of the components and the loading of the components into the apparatus. As will be evident from the following disclosure, the pre-assembly of the components may be effected at a location that is remote from the apparatus in order to minimize the possibility of injury to the operator.

Briefly, the present invention provides a motor driven, rotatable plate on the periphery of which is mounted a plurality of radially extending posts for supporting the components that are to be assembled. Each of the posts is spring biased in a radially outward direction. The posts, with the components loosely mounted thereon travel along an arcuate path in opposition to a fixed cam surface that has a decreasing radius with a respect to the rotational axis of the plate (in the direction of the plate). The fixed cam surface bears against the radially outer end of the inner component and gradually forces it radially inward into the other component.

At the end of the fixed cam surface there is provided a spring block having a movable cam-like surface that is normally biased in a direction that tends to further press the inner component into the outer component. The purpose for the spring block and its cam-like surface is to accommodate and compensate for any dimensional variations in the length of the components. After traversing the arcuate, cam-like surface of the spring block, the assembled components will fall off the support posts by gravity as the plate rotates, so that the assembled components can then be collected.

A brake and clutch assembly is used with the motor together with a reduction gear assembly. A drive bushing which is keyed to the output of the motor is also keyed to a shaft on which the rotatable plate is supported. A pair of pillow blocks are used for mounting the plate shaft on bushings which are, in turn, mounted on a base that is common with the reduction gear assembly.

Accordingly, it is an object of the present invention to provide an improved apparatus for assemblying two telescoped components.

Another object of the present invention is to provide improved apparatus, as described above, that is automatic in operation.

A further object of the present invention is to provide automatic assembly apparatus for telescopingly pressing one component into another wherein there is a tight fit between the two components.

A further object of the present invention is to provide an improved apparatus for telescopingly assembling two components wherein cam means apply a constant pressure that forces one of the components into the other component.

Yet another object of the present invention is to provide improved assembly apparatus, as described above, wherein means are included for accommodating and compensating for dimensional variations in the components.

It is still another object of the present invention to provide an improved assembly apparatus, as described above, that is low in cost and which reliably assemblies the two components in an automatic manner.

A further object of the present invention is to providee an improved assembly apparatus, as described above, that requires a minimum of skill in its operation.

A further object of the present invention is to provide an improved assembly apparatus, as described above, that is inherently safe to operate.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which.

DESCRIPTION OF THE PREFERRED EMBODIMENT

As mentioned hereinabove, the present invention is particularly adapted for telescopingly assembling two components, one pressed into the other. While many different types of components, one pressed into the other. While many different types of components may be assembled utilizing the present invention, a metallic conduit section such as is used for protecting electrical conductors and a plastic insulator will be described and illustrated for purposes of explanantion only. It should be clearly understood however, that the present invention is not in any way limited to the two components illustrated and described.

Figure 4:
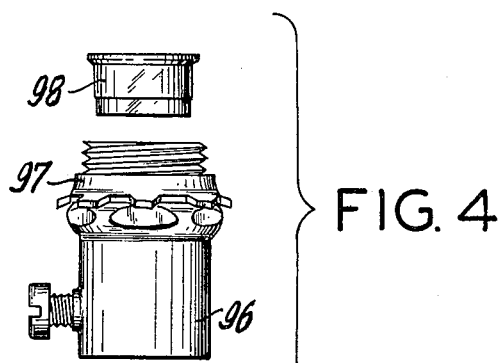
FIG. 4 is an exploded, elevational view illustratingg two typical components that may be assembled utilizing the apparatus comprising the present invention.
Figure 1:
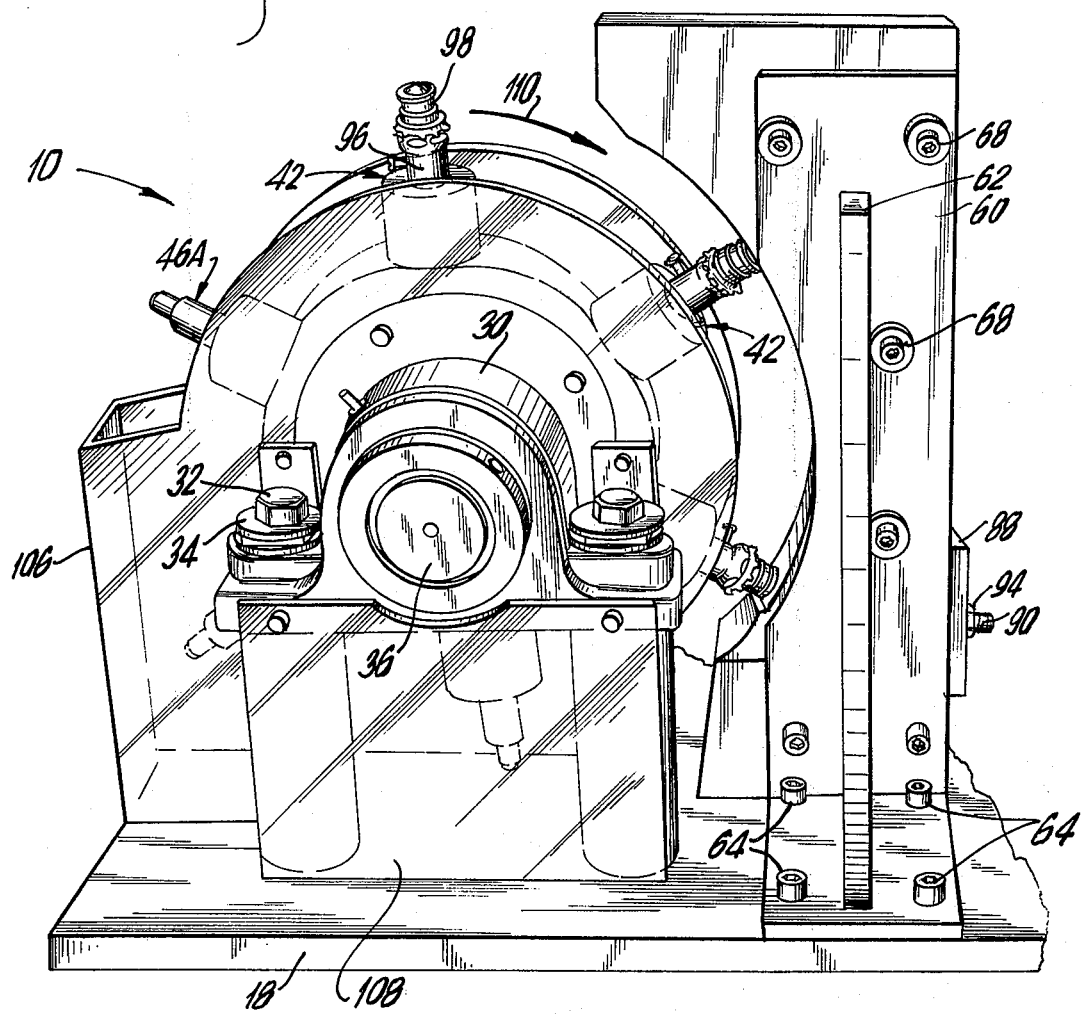
FIG. 1 is a perspective view of the assembly apparatus comprising the present invention.
Figure 2:
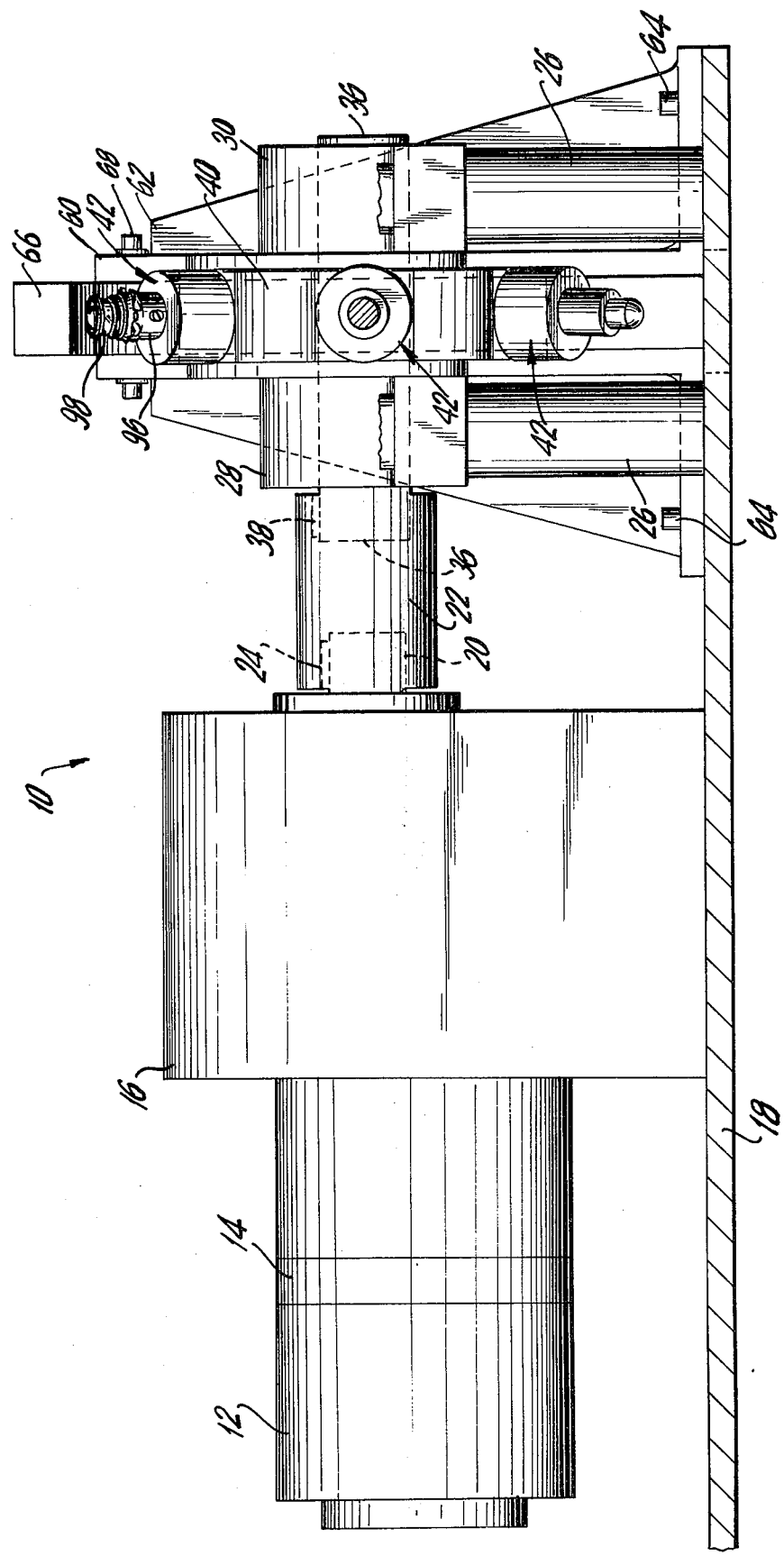
FIG. 2 is a side elevational view, partially broken away, of the assembly apparatus shown in FIG. 1.

Turning first to FIGS. 1 and 2 it will be seen that the assembly apparatus 10 comprising the present invention includes a conventional drive motor 12 having a conventional brake and clutch assembly 14 secured thereto. A conventional speed reducing assembly 16 is coupled to the motor 12 and the brake and clutch assembly 14 and is mounted on a base member 18. The output shaft 20 of the speed reducer 16 is coupled to a drive bushing 22 by means of a key 24.

Four elongated bushings 26 are vertically mounted on the base plate 18. Two of the bushings 26 support a first pillow block 28 while the other two bushings 26 support a second pillow block 30. Fasteners, such as screws 32 and washers 34 are used to secure the pillow blocks 28 and 30, to their respective pairs of bushings 26. A driven shaft 36 is journalled in the two axially spaced apart pillow blocks 28 and 30 and is secured to the drive bushings 22 by means of a key 38.

Figure 3:
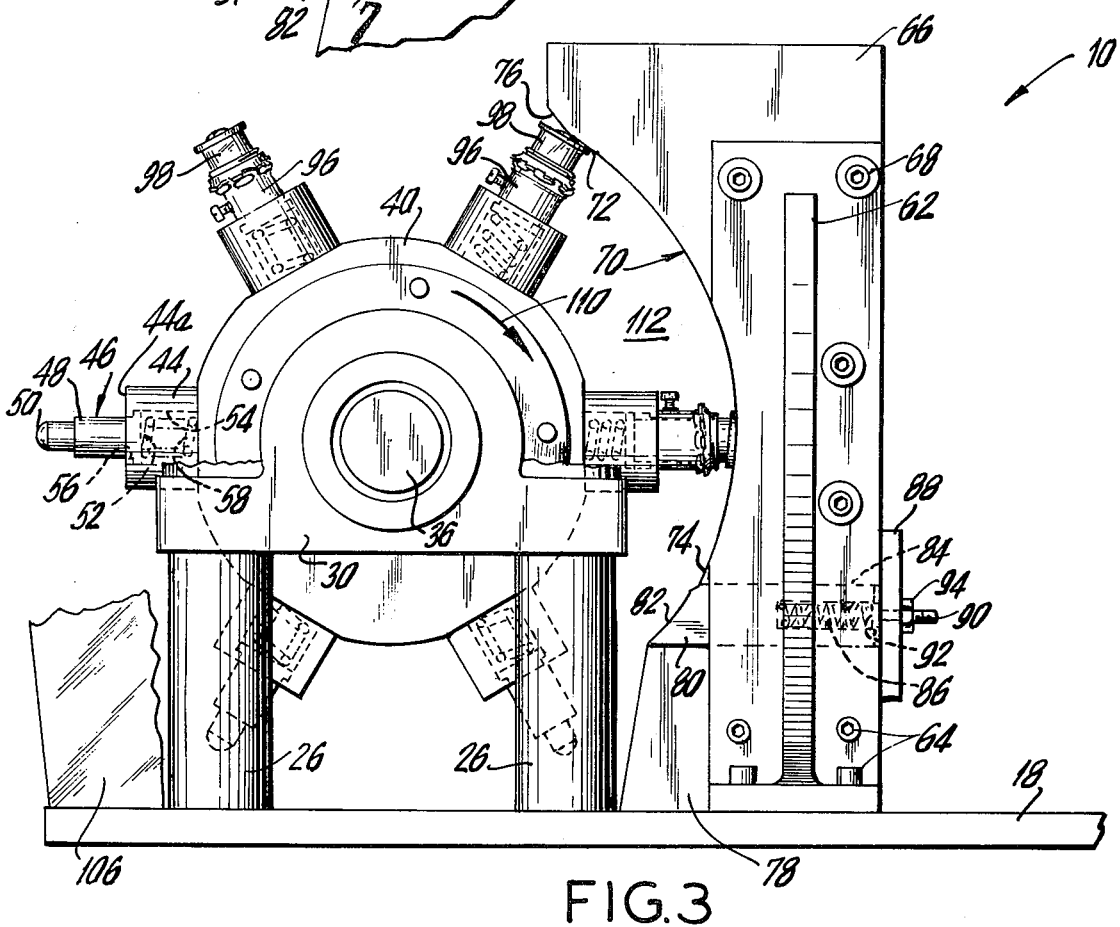
FIG. 3 is a front elevational view, partially broken away, of a portion of the assembly apparatus comprising the present invention.

A plate 40 is suitably secured to the driven shaft 36 for rotation together therewith. In the embodiment illustrated, the plate 40 is substantially circular and is provided on its periphery with a plurality of flats on which are mounted support means that are generally designated by reference character 42. Each of the support means 42 is comprised of a base portion 44 and a post 46 having two different diameters designated by the reference characters 48 and 50. As shown in FIG. 3, the end of the post 46 that is opposite the diameter 50 is provided with an enlarged head 52. The enlarged head 52 of the post 46 is received in a first larger diameter bore 54 of the base portion 44, while the larger diameter 48 of the post 46 is received in a second, smaller diameter bore 56 of the base portion 44. A compression spring 58 is positioned within the larger bore 54 of the base portion 44. One end of the compression spring 58 bears against the head 52 of the post 46 while the other end of the compression spring 58 bears against a portion of the plate 40. Thus, the compression spring 58 normally urges the post 46 in a radially outward direction with respect to the axis of rotation of the plate 40.

A pair of spaced apart generally L-shaped cam holders 60, each of which includes a stiffening rib 62, are secured to the base plate 18 by means of fasteners such as screws 64. A cam, which is generally designated by the reference character 66, is sandwiched between the cam holders 60 and is secured thereto by means of fasteners such as a plurality of screws 68. The cam 66 is defined by an arcuate cam surface 70 which, in the direction of rotation (clockwise as shown in FIG. 3) of the plate 40 has a decreasing radius with respect to the axis of rotation of the plate 40. That is, the area designated as 72 on the cam surface 70 is at a greater distance from the axis of rotation of the plate 40 than is the area designated by the reference character 74 on the cam surface 70. Preferably, the radius of the cam surface 70 decreases uniformly and smoothly between the areas 72 and 74 which are the entry and exit ends of the cam surface 70, respectively. For purposes to be described hereinafter, the entry end 72 of the cam surface 70, is provided with a bevel 76.

Figure 6:
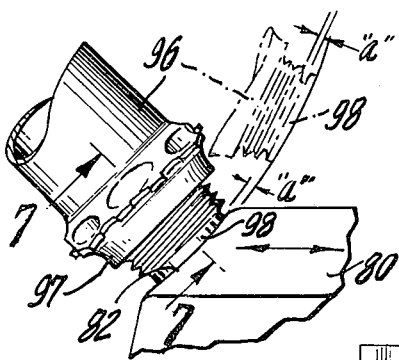
FIG. 6 is a fragmentary, elevational view illustrating the two components shown in FIG. 4 in a completely assembled condition and illustrating a feature of the present invention.

A spacer block 78 is suitably secured to the base plate 18 directly below the cam 66 and in spaced relationship thereto. A movable spring block, which is generally designated by the reference character 80, is positioned between the lower end of the cam 66 and the upper surface of the spacer block 78. Shims (not shown) may be used to accurately establish the height of the spacer block 78. The left-hand end 82 (FIGS. 1, 3 and 6) of the spacer block 80 is arcuate and is slightly offset with respect to the exit end 74 of the cam surface 70. That is, the surface 82 of the spring block 80 is to the left of the exit end 74 as shown in FIG. 3. The spring block 80 is further provided with a bore 84 at its right-hand end in which is positioned a compression spring 86. A plate 88 which is suitably secured to the cam holders 60 retains the compression spring 86. A threaded stud 90 having a head 92 which bears against the compression spring 86 is threaded through the plate 88. A nut 94 is used to accurately position the threaded stud 90.

Figure 5:
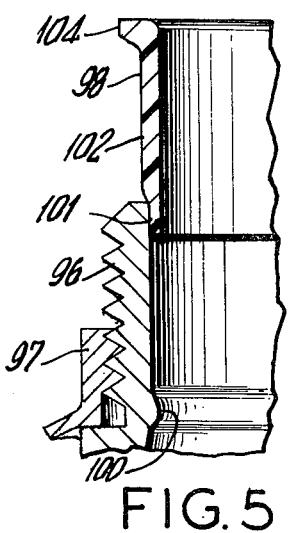
FIG. 5 is a fragmentary, sectional elevational view, on an enlarged scale, illustrating the two components shown in FIG. 4 in a partially assembled condition at the beginning of the assembly operation.
Figure 7:
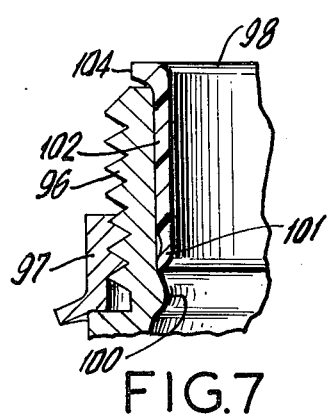
FIG. 7 is an enlarged, fragmentary sectional view of the two components taken along line 7–7 of FIG. 6.

As noted hereinabove, the operation of the present invention will be described in connection with a metallic conduit 96 having a metal member 97 threaded thereon and a plastic, internal insulator 98. Referring particularly to FIGS. 5 and 7, it will be seen that the metallic conduit 96 is provided with an integral, internal stop in the form of a rib 100. The plastic insulator 98 is provided with a first diameter 101 that loosely fits within the conduit 96. A second diameter 102 of the plastic insulator 98 is larger than the inside diameter of the conduit 96 so that in order to assemble the plastic insulator 98 within the conduit 90, a substantial axial force must be applied. The plastic insulator 98 also includes, at the end thereof opposite the diameter 101, a radially extending lip 104 that serves to limit the insertion of the plastic insulator 98 wthin the conduit 96.

Before discussing the mode of operation of the present invention it is worthwhile to note that a guard member 106 straddled the plate 40 in order to preclude the possibility of the operator being injured during the assembly procedure. A second guard member 108 is also secured to the pillow blocks 28 and 30, as shown in FIG. 1, for the same purpose.

The operator loosely assembles the conduit 96 and the insulator 98 as shown in FIG. 5 and then places the partially assembled components on the support means designated by the reference character 46A in FIG. 1. As the motor 12 drives the plate 40, the support means 46A will travel along an arcuate path designated by the arrow 110 in FIG. 1. Other partially assembled components will also be placed on successive ones of the support means 46 as the plate 40 rotates.

Initially the partially assembled conduit 96 and the insulator 98 rest loosely on the transverse, radially outward face 44a of the block 44. As the plate 40 rotates, the bevel 76 of the cam 66 allows the partially assembled conduit 96 and insulator 98 to enter the space 112 between the periphery of the plate 40 and the cam surface 70. The cam 66 is initially set to accommodate the length of the conduit 96 plus the external length of the insulator 98 plus a few thousandths of an inch. This allows both components 96 and 98 to enter the space 112 freely before assembly. Where different lengths of conduit 96 or insulators 98 are employed, the length of the base portion 44 will have to be changed. In other words, it is necessary to vary the position of the transverse surface 44a in order to accommodate different size components.

The cam 66 is also positioned such that the insulator 98 will be almost but not quite completely inserted at the exit end 74. The final insertion of the insulator 98 into the conduit 96 is accomplished by means of the movable spring block 80. The tension of the spring 86 is selected so as to exert the necessary forces to accomplish the final insertion and to allow the assembled unit to move the spring block 80 in order to pass thereby. In the embodiment illustrated (FIG. 6), there will be a gap *a* approximately 0.050 inches between the lip 104 of the insulator 98 and the opposed end of the conduit 96 at the exit end 74 of the cam surface 70. The surface 82 of the spring block 80 also extends a maximum of approximately 0.050 inches to the left of the surface 74, being limited to this left side position by suitable stop means. This is done to accommodate any dimensional variations in a given size conduit 96.

After the final insertion, the assembled insulator 98 and conduit 96 as a unit (FIG. 7) exerts a force on the spring block 80, where the spring 86 allows the spring block 80 to move to the right towards the plate 88 so that the unit (conduit 96 and insulator 98) is not damaged, such movement being approximately 0.050 inches or less. Thus, the spring block 80 compensates for dimensional variations in the assembled unit which can not be accomplished by the fixed cam 66. The stud 90 is threaded in and out of the bore 84 in order to adjust the compressive force of the spring 86 and is locked in place by the nut 94 when the proper force is achieved.

From the foregoing it will be appreciated that an improved low cost assembly apparatus has been provided for telescopingly inserting one component into another. The apparatus described hereinabove is inherently safe and requires a minimum of skill in its operation. Accordingly, by virtue of the present invention, the cost of assembling two components is materially reduced as compared to hand assembly and, in addition, fatigue of the operator is minimized.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. Apparatus for assembling first and second components in telescoping relationship with each other, said apparatus comprising:
   A. a movable plate;
   B. a plurality of component support means mounted on said plate for movement together therewith along a predetermined path, said support means being adapted to receive the two components in a partially assembled condition;
   C. cam surface means positioned in opposition to the path of said support means, said cam surface means being arranged to engage a first one of the two components during movement of said plate and said support means where said cam surface means bear against the first component and forceably displace the first component into telescoping relationship within the second component; and
   D. each said support means including a post extending outwardly from said plate and spring means for normally biasing said post in an outward direction to permit engagement between said first component and said cam surface means, the two components being loosely seated on said post prior to engaging said cam surface means.

2. An assembling apparatus according to claim 1, wherein said plate is rotatable and said predetermined path is arcuate.

3. An assembling apparatus according to claim 1, wherein said support means further comprises a base portion secured to said plate, said base portion including a bore for receiving an end of said post and said spring means whereby said spring means extends between said end of said post and a portion of said plate.

4. An assembling apparatus according to claim 3, wherein an end of said base portion defines a traverse face against which one end of the second one of the components is seated.

5. Apparatus for assembling first and second components in telescoping relationship with each other, said apparatus comprising:
   A. a movable plate;
   B. a plurality of component support means mounted on said plate for movement together therewith along a predetermined path, said support means being adapted to receive the two components in a partially assembled condition;
   C. cam surface means positioned in opposition to the path of said support means, said cam surface means being arranged to engage a first one of the two components during movement of said plate and said support means where said cam surface means bear against the first component and forceably displace the first component into telescoping relationship within the second component;
   D. said cam surface means being defined by entry and exit ends and an intermediate portion having a surface gradually extending toward said plate between said entry and exit ends, said surface being closest to said plate adjacent said exit end, said plate between in a direction from said entry end toward said exit end; and
   E. said cam surface means including a movable section proximate said exit end thereof and spring means for biasing said movable section in a direction towards said plate and said support means.

6. An assembling apparatus according to claim 5, wherein said plate is rotatable and said predetermined path is arcuate.

7. An assembling apparatus according to claim 5, wherein said cam surface means has a bevel at the entry end thereof.

8. An assembling apparatus according to claim 5, wherein there is further included means for adjusting the force exerted by said spring means that biases said movable section whereby the position of said movable section is offset with respect to the remainder of said cam surface means.

9. An assembling apparatus according to claim 2, wherein there is further included a motor and shaft means operatively coupled to said motor, said plate being coupled to said shaft means.

* * * * *